Nov. 1, 1949.                A. ERICKSON                2,486,395
                      PICKUP ATTACHMENT FOR RAKES
                         Filed March 26, 1946
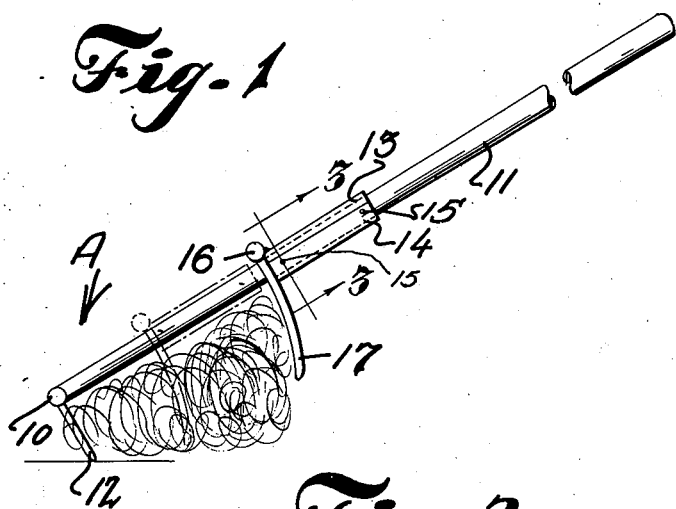
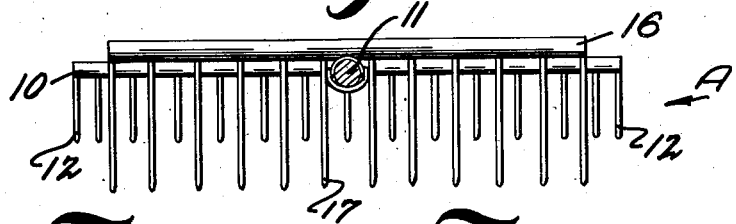
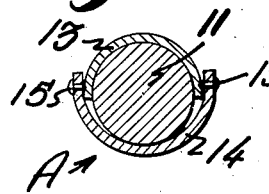   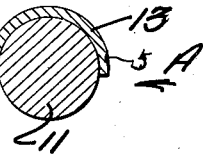
INVENTOR.
Algot Erickson
BY Victor J. Evans & Co.
ATTORNEYS Patented Nov. 1, 1949

2,486,395

UNITED STATES PATENT OFFICE 2,486,395

PICKUP ATTACHMENT FOR RAKES

Algot Erickson, East Chicago, Ind.

Application March 26, 1946, Serial No. 657,112

1 Claim. (Cl. 56—400.12)

The invention relates to a hand rake and more especially to a pickup attachment for a hand rake.

The primary object of the invention is the provision of an attachment of this character, wherein loose material, such as cut grass, weeds or other gatherings effected by the rake can be conveniently picked up by the latter during the use thereof, so that these gatherings can be carried from one locality to another, and this manner enabling a lawn to be cleaned with ease and dispatch.

Another object of the invention is the provision of an attachment of this character, wherein it is useful for cleaning the tines of the rake, when gatherings thereby hang to such tines, the attachment being novel in construction and unique in the assembly thereof with the rake of the hand type.

A further object of the invention is the provision of an attachment of this character, which is simple in construction, thoroughly reliable and effective in operation, strong, durable, conveniently operated, devoid of interference with the raking operation, picks up and releases a load, readily and easily adjusted, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is a side view of a rake showing the attachment constructed in accordance with the invention, the attachment being shown in full lines in one position and by dotted lines in the position of clamping a bundle of leaves, hay, or the like.

Figure 2 is a cross sectional view aft of the rake head with the attachment in elevation.

Figure 3 is a sectional view on an enlarged scale taken on the line 3—3 of Figure 1 looking in the direction of the arrows.

Figure 4 is a view similar to Figure 3 showing only a part of the attachment removed.

Similar reference characters indicate corresponding parts throughout the several views in the drawing.

Referring to the drawing in detail, A designates generally a hand rake of the ordinary well known construction, having the usual tined head 10 and elongated handle 11 respectively, the head 10 being carried by the latter in a well known manner, the tines 12 of this head 10 being straight and spaced apart uniformly.

On the handle 11 of the hand rake A is mounted the attachment constituting the present invention, and in this instance, comprises a sectional sleeve-like runner slidably embracing the said handle, its sections 13 and 14 respectively, interconnected by pins 15, at the ends, which are positioned to snap into indentations 5 in the section 13 as the lower section 14 is snapped over the upper section 13 to embrace the handle. At one end of this runner is a tined crosshead or mounting member 16, its tines 17 being of greater length than the tines 12 and curved in the direction of the latter, so that a load of gathered material by the rake A can be collected between the heads 10 and 16, when the latter has been moved toward the said head 10, and thereby permitting the collected load to be carried manually by the rake from one locality to another for deposit in bulk from the said rake A.

The runner with its sections 13 and 14 slidably travel to and from the head 10 on the handle 11 of the rake A, for the picking-up and discharge of a load of material in the use of the said rake.

What is claimed is:

In a hand rake and carrier, the combination which comprises an elongated handle having a rake head with tines thereon at one end, an upper semi-cylindrical sleeve section slidably mounted on the said handle on one end of which a crosshead with downwardly extended tines thereon is carried, said upper sleeve section having indentations in the outer surface spaced from the lower edges thereof, and positioned whereby the tines of the crosshead coact with the tines of the rake head to grip leaves, hay or the like, and a complementary lower semi-cylindrical sleeve section having projections on the inner surface thereof, spaced from the edges and registering with the indentations of the upper sleeve section providing removable connecting means of the sleeve sections, whereby the said upper and lower sleeve sections embrace the handle for retaining the said tined crosshead thereon.

ALGOT ERICKSON.

REFERENCES CITED

The following references are of record in the file of this patent:

UNITED STATES PATENTS

| Number | Name | Date |
| --- | --- | --- |
| 697,305 | Wiley | Apr. 8, 1902 |
| 1,055,224 | Proctor | Mar. 4, 1913 |
| 1,715,613 | McFadden | June 4, 1929 |